(12) United States Patent
Okubo

(10) Patent No.: US 10,834,271 B2
(45) Date of Patent: Nov. 10, 2020

(54) IMAGE TRANSMISSION APPARATUS AND ELECTRONIC DATA TRANSMISSION METHOD FOR TRANSMITTING STORAGE LOCATION INFORMATION OF ELECTRONIC DATA

(71) Applicant: Sharp Kabushiki Kaisha, Sakai (JP)

(72) Inventor: Masanori Okubo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/933,439

(22) Filed: Mar. 23, 2018

(65) Prior Publication Data

US 2018/0278759 A1 Sep. 27, 2018

(30) Foreign Application Priority Data

Mar. 24, 2017 (JP) .................................. 2017-059741

(51) Int. Cl.
*H04N 1/00* (2006.01)
*H04N 1/32* (2006.01)

(52) U.S. Cl.
CPC ..... *H04N 1/00212* (2013.01); *H04N 1/32128* (2013.01); *H04N 2201/3249* (2013.01); *H04N 2201/3276* (2013.01)

(58) Field of Classification Search
CPC .......... H04N 1/00212; H04N 1/32128; H04N 2201/3249; H04N 2201/3276; H04N 1/00225

See application file for complete search history.

(56) References Cited

U.S. PATENT DOCUMENTS

2009/0313340 A1* 12/2009 Ando ................. H04N 1/32069
709/206
2012/0047213 A1* 2/2012 Hanada .................. H04L 51/08
709/206

FOREIGN PATENT DOCUMENTS

| CN | 101605193 A | 12/2009 |
| CN | 102377689 A | 3/2012 |
| JP | 2003-178011 A | 6/2003 |
| JP | 2006-311344 A | 11/2006 |
| JP | 2009-301329 A | 12/2009 |

\* cited by examiner

*Primary Examiner* — Mohammad H Ghayour
*Assistant Examiner* — Pawan Dhingra
(74) *Attorney, Agent, or Firm* — Keating & Bennett, LLP

(57) ABSTRACT

An image transmission apparatus includes an information input unit that inputs predetermined information, a memory that stores the predetermined input information as electronic data, a communication unit that transmits an electronic mail to a predetermined transmission destination, a storage location information generating unit that generates storage location information indicating a location where the electronic data is stored, a storage location tagged mail generating unit that generates a storage location tagged electronic mail including the storage location information, an acquisition request acknowledgment unit that acknowledges an acquisition request to acquire electronic data from the transmission destination, and an electronic data loaded mail generating unit that generates an electronic data loaded mail including the electronic data.

8 Claims, 8 Drawing Sheets

FIG. 3A

| TRANSMISSION DESTINATION NAME | MAIL ADDRESS | IDENTIFICATION ID (ENCRYPTION CODE) |
|---|---|---|
| AAA1234 | user01@aaa.co.jp | user-1234 |
| BBB7777 | user77@bbb.co.jp | user-7777 |
| ⋮ | ⋮ | ⋮ |
| ZZZ9999 | user99@zzz.co.jp | user-9999 |

FIG. 3B

| FILE NAME | STORAGE LOCATION INFORMATION (URL) |
|---|---|
| scandata01.pdf | http://mfp/image/file/scandata01.pdf |
| scandata02.jpg | http://mfp/image/file/scandata02.jpg |
| ⋮ | ⋮ |
| scandataxx.doc | http://mfp/image/file/scandataxx.doc |

| CHECK CONFIGURATION TIME | 30 MINUTES |
|---|---|

| REQUEST ACKNOWLEDGMENT FLAG | UNFINISHED | ACKNOWLEDGMENT REQUEST MAIL NOT YET RECEIVED |
|---|---|---|
| | FINISHED | ACKNOWLEDGMENT REQUEST MAIL RECEIVED |

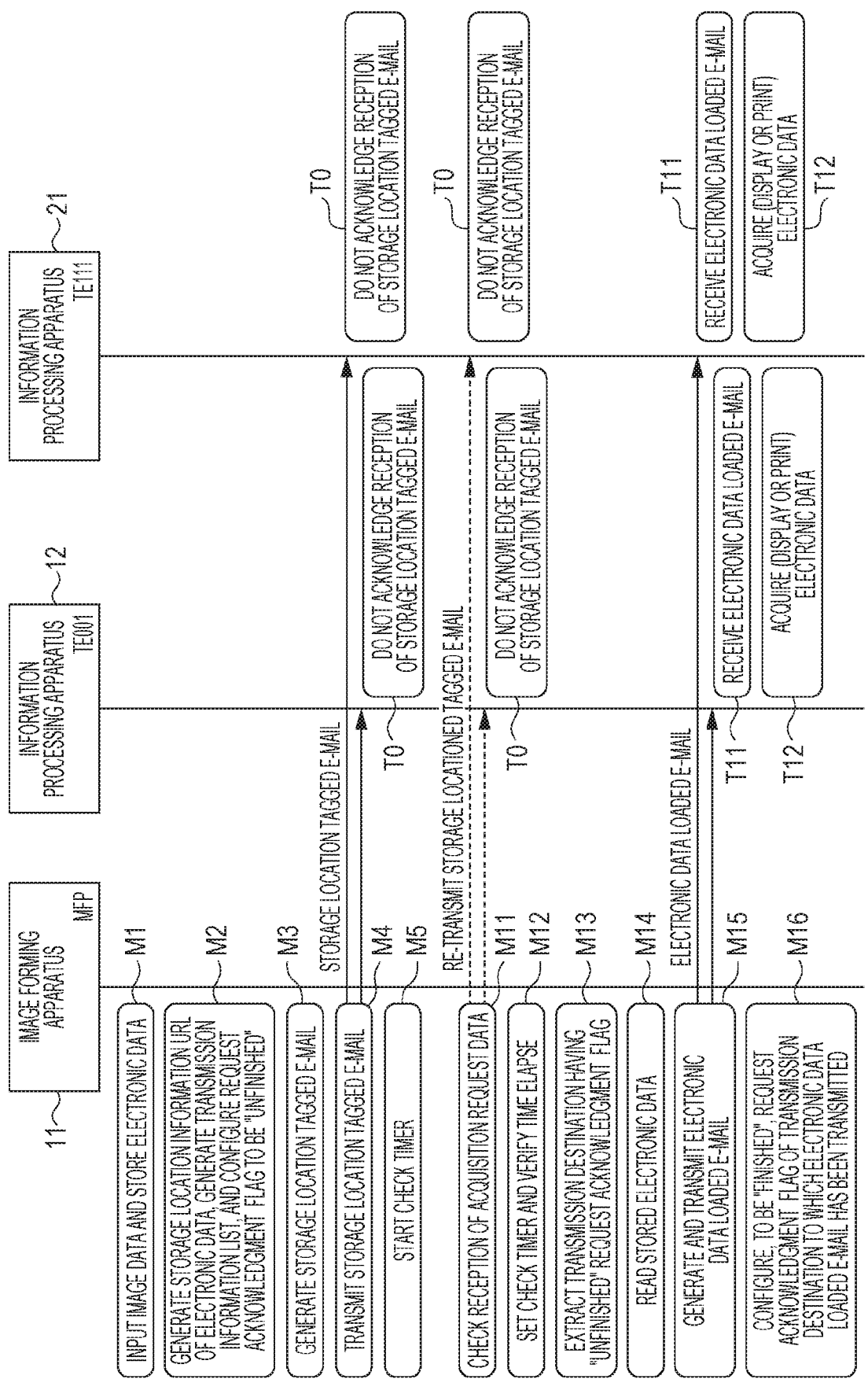

IMAGE TRANSMISSION APPARATUS AND ELECTRONIC DATA TRANSMISSION METHOD FOR TRANSMITTING STORAGE LOCATION INFORMATION OF ELECTRONIC DATA

BACKGROUND

1. Field

The present disclosure relates to an image transmission apparatus and an electronic data transmission method.

2. Description of the Related Art

Image forming apparatuses have been used, and some of them are multi-function apparatuses that have a functionality to scan documents, and a functionality to connect to a network, in addition to a functionality to copy documents. For example, a multi-function apparatus has a mail transmission functionality. Such a multi-function apparatus attaches, to an electronic mail (e-mail), electronic data of a scanned document as a file after a user has performed a scanning operation on the document, and transmits to a mail address of a partner user set by the user the e-mail including the file.

Another multi-function apparatus also has a mail transmission function. Such a multi-function apparatus stores electronic data of a scanned document on a memory medium, such as a hard disk, and transmits, to a mail address of a partner user set by a user, an e-mail containing in a body thereof information indicating a location where the electronic data is stored (storage location information). In this case, the file of the electronic data is not contained in the e-mail. The partner user having received the e-mail containing in the body thereof the storage location information accesses the location where the electronic data is stored, using the storage location information in the received e-mail, and then acquires the electronic data of the scanned document.

Japanese Unexamined Patent Application Publication No. 2003-178011 describes an e-mail transmission apparatus. In order to transmit an e-mail with a file attached thereto, the e-mail transmission apparatus uses file separation information that sets in advance on a per mail address basis of transmission destinations a condition that is used to determine whether the attached file is to be separated or not. The e-mail transmission apparatus thus determines whether the e-mail is to be transmitted with the file separated therefrom or with the file attached thereto. If the attached file is to be separated, the e-mail transmission apparatus transmits the e-mail containing in the body thereof a uniform resource locator (URL) of the file without any attached file.

When an e-mail is transmitted with the electronic data of the scanned document attached thereto, the e-mail contains the file. The size of the e-mail increases, and a workload on a mail server that relays the e-mail increases. If the size of the e-mail with the file attached thereto exceeds a communication capacity limit, there is a possibility that the e-mail fails to reach the destination thereof.

When the e-mail containing in the body thereof the storage location information, the e-mail contains no attached file. A workload imposed on a mail server that relays the e-mail is smaller. However, if the e-mail is configured to be transmitted with the storage location information described in the body of the e-mail in a standard operation, a partner user is forced to access the location where the electronic data is stored and to acquire the file of the electronic data. It takes time to acquire the electronic data, and an operational workload on the user increases.

According to Japanese Unexamined Patent Application Publication No. 2003-178011, the condition as to whether the e-mail is to be transmitted with the file separated therefrom or not is to be configured in advance on a per partner user basis of the e-mails. It takes the user's time to configure the determination condition. Whether the e-mail is to be received with the file separated therefrom or attached thereto may be changed depending on a request from the partner user who is going to receive the e-mail or a system operational status. Changing the determination condition on each occasion leads to an increase in the user's workload.

If an e-mail with a file separated is transmitted, a partner user who has received the e-mail accesses the location of the electronic data in accordance with the storage location information (URL of the attached file) in the received e-mail. Depending on the connection status of a network in use, the partner user may have difficulty accessing the location of the electronic data. For example, a multi-function apparatus having stored the electronic data has a direct access to a global network, such as the Internet, the partner user may access the location of the electronic data by setting the URL of the attached file and may acquire the electronic data.

A multi-function apparatus having stored electronic data may be connected to a company in-house local-area network (LAN). Security is configured such that only information processing apparatuses connected to the company in-house LAN are enabled to access the electronic data but accessing from outside the company or a network in another position is inhibited. Even if a partner user that is not allowed to connect to the in-house LAN receives an e-mail containing in the body thereof a URL of an attached file, the partner user is not able to connect to the multi-function apparatus having stored the electronic data, and fails to acquire the electronic data.

The partner user having once failed to acquire the electronic data may acquire the electronic data as described below. The partner user may notify a sender user that the partner user has been unable to acquire the electronic data, and the sender user may transmit to the partner user an e-mail with a file attached thereto. In such a case, the workload imposed on the sender user increases, and further it takes the partner user's time to acquire the attached file.

The determination condition to transmit the e-mail with the file separated may be configured. In order to save the sender user time for transmitting the e-mail with the file attached thereto as described above, a consideration is given to determining whether the partner user who is going to receive the e-mail has access to the multi-function apparatus having stored the electronic data. A workload on the sender user who configures the determination condition increases.

SUMMARY

It is desirable to provide an image forming apparatus that reduces a workload imposed on a sender of an e-mail and allows a partner user to easily receive the e-mail when the e-mail that does not include a file of electronic data but includes storage location information of the electronic data is transmitted to the partner user who does not have direct access to the storage location of the electronic data.

According to an aspect of the disclosure, there is provided an image transmission apparatus. The image transmission apparatus includes an information input unit that inputs predetermined information, a memory that stores the predetermined input information as electronic data, a communication unit that transmits an electronic mail to a predetermined information processing apparatus, a storage location information generating unit that generates storage location information indicating a location where the electronic data is stored, a storage location tagged mail generating unit that generates a storage location tagged electronic mail including the storage location information, an acquisition request acknowledgment unit that acknowledges an acquisition request to acquire electronic data from the information processing apparatus, and an electronic data loaded mail generating unit that generates an electronic data loaded mail including the electronic data. If the acquisition request acknowledgment unit does not acknowledge the acquisition request of the electronic data from an information processing apparatus serving as a predetermined transmission destination after a predetermined check configuration time has elapsed since transmission of the storage location tagged electronic mail including the storage location information from the communication unit to the information processing apparatus as the predetermined transmission destination, the electronic data loaded mail generating unit generates the electronic data loaded mail including the electronic data, and the communication unit transmits the electronic data loaded mail including the electronic data to the information processing apparatus as the predetermined transmission destination.

According to another aspect of the disclosure, there is provided an electronic data transmission method. The electronic data transmission method includes inputting predetermined information and storing the predetermined information as electronic data, generating storage location information indicating a location where the electronic data is stored, and if an acquisition request of the electronic data is not received from an information processing apparatus serving as a predetermined transmission destination after a predetermined check configuration time has elapsed since transmission of a storage location tagged electronic mail including the storage location information to the information processing apparatus as the predetermined transmission destination, automatically transmitting an electronic data loaded electronic mail including the electronic data to the information processing apparatus as the predetermined transmission destination.

BRIEF DESCRIPTION OF THE DRAWINGS

FIG. 3A through FIG. 3E illustrate information used in the image forming apparatus of an embodiment of the disclosure;

FIG. 7 is a communication sequence chart of communication performed between the image forming apparatus and the information processing apparatus in accordance with an embodiment of the disclosure.

DESCRIPTION OF THE EMBODIMENT

Figure 1:
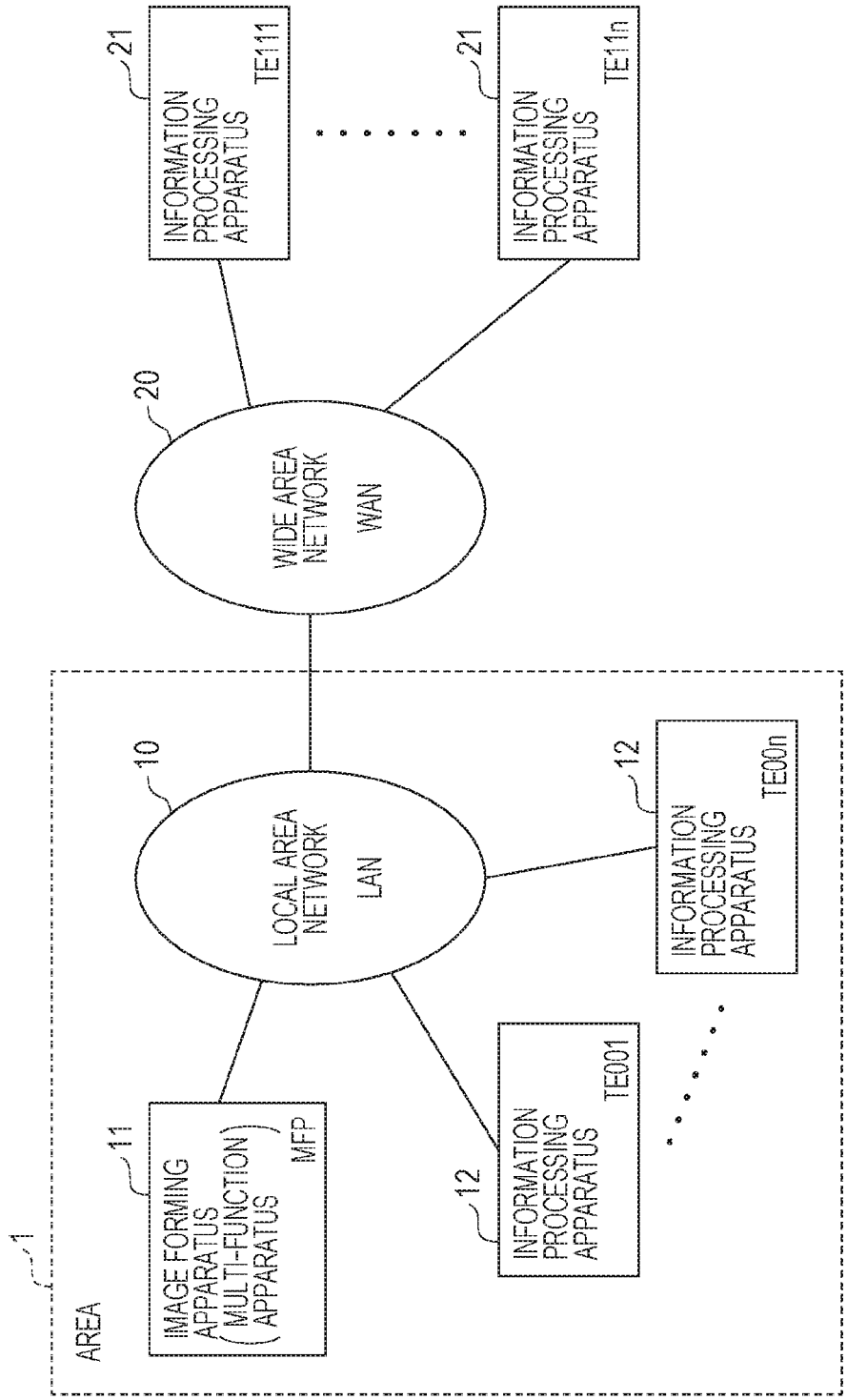
FIG. 1 is a configuration diagram of a communication system including an image forming apparatus according to an embodiment of the disclosure.

Embodiments of the disclosure are described with reference to the drawings. The description of the embodiments does not limit the scope of the disclosure. Configuration of communication system including image forming apparatus FIG. 1 is a configuration diagram of a communication system including an image forming apparatus according to an embodiment of the disclosure. Referring to FIG. 1, an image forming apparatus 11 and multiple information processing apparatuses (TE001 through TE00n) 12 installed in the same area (for example, within the same building or the same floor) are connected to each other via a local area network (LAN) 10.

The image forming apparatus (also referred to as multi-function peripheral (MFP)) 11 processes image data, and is an electronic apparatus having a copying functionality, printing functionality, scanning functionality, facsimile functionality, communication functionality, and the like. The information processing apparatus (also referred TE) 12 is an electronic apparatus such as a personal computer, a tablet terminal, a smart phone, or other portable terminal.

The LAN 10 is a wired or wireless network, and connects the image forming apparatus 11 to the information processing apparatuses 12. For example, if no particular limit is set on communication link, the electronic data is transmitted from the information processing apparatus TE001 to the image forming apparatus 11, or image data input through the scanning functionality is transmitted from the image forming apparatus 11 to the information processing apparatus TE00n. A specific mail server (not illustrated) connected to the LAN 10 allows multiple information processing apparatuses 12 to exchange an e-mail therebetween, and allows the image forming apparatus 11 and the information processing apparatus 12 to exchange an e-mail therebetween.

The LAN 10 is connected to a wide area network (WAN) 20, such as the Internet. The WAN 20 connects to another LAN, and multiple information processing apparatuses (TE111 through TE11n) 21 present outside the area 1.

Another mail server (not illustrated) is connected to the WAN 20. Via the mail servers, an e-mail may be transmitted or received between the information processing apparatus (TE001 through TE00n) 12 connected to the LAN 10 in the area 1 and the information processing apparatus (TE111 through TE11n) 21 present external to the area 1. Also, an e-mail may be transmitted or received between the image forming apparatus 11 and the information processing apparatus (TE111 through TE11n) 21 present external to the area 1.

If no particular communication connection limit is set, specific data communication is performed between the image forming apparatus 11 and the information processing apparatuses 21 (TE111 through TE11n) external to the area 1 via the WAN 20 and the LAN 10. For example, when the information processing apparatus TE111 transmits the acquisition request of electronic data to the image forming apparatus 11, the file of the electronic data stored on the image forming apparatus 11 is transmitted to the information processing apparatus TE111.

If a router having a security functionality or a firewall device is mounted in the LAN 10, and these devices set a communication limit on accessing from the WAN 20, communication between the image forming apparatus 11 and the information processing apparatus (TE111 or TE11n) external to the area 1 may be limited. For example, the acquisition request of the electronic data transmitted from the information processing apparatus TE111 may possibly fail to reach the image forming apparatus 11.

In accordance with the disclosure, an e-mail may be transmitted or received between the image forming apparatus 11 and the information processing apparatus 21 present internal to the area 1. Even if the information processing apparatus 21 external to the area 1 is not enabled to connect to the image forming apparatus 11, the electronic data that the information processing apparatus 21 may possibly request to acquire may be attached to an e-mail and the image forming apparatus 11 may transmit the e-mail to the information processing apparatus 21. If no response is received from a specific information processing apparatus TE even after a specific time period has elapsed since the transmission of an e-mail indicating the location of the electronic data whose acquisition is requested from the image forming apparatus 11 to the specific information processing apparatus TE, the electronic data stored on the image forming apparatus 11 is attached to an e-mail, and the e-mail with the electronic data attached thereto is transmitted to the information processing apparatus TE.

Figure 2:
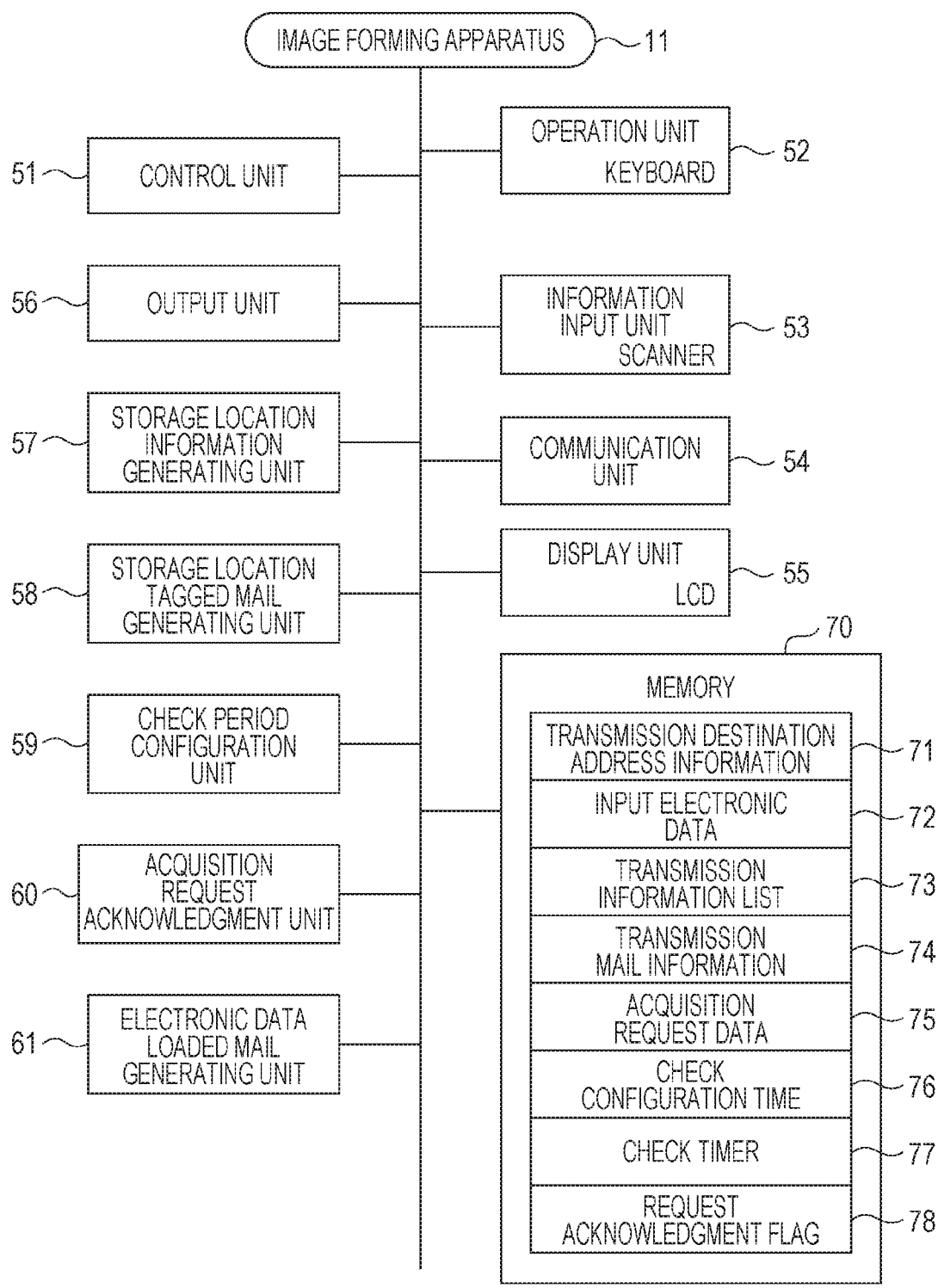
FIG. 2 is a configuration block diagram of the image forming apparatus of an embodiment of the disclosure.

In the case that the image forming apparatus 11 transmits to the specific information processing apparatus the e-mail indicating the location where the desired electronic data is stored, the image forming apparatus 11 transmits the e-mail with no electronic data attached thereto. The size of the e-mail to be transmitted is reduced, and the workload on the mail server is thus reduced. The communication system including the information processing apparatus of the disclosure has been described. Configuration of image forming apparatus FIG. 2 is a configuration block diagram of the image forming apparatus (MFP) 11 of the embodiment of the disclosure. Referring to FIG. 2, the image forming apparatus (MFP) 11 of the disclosure includes a control unit 51, an operation unit 52, an information input unit 53, a communication unit 54, a display unit 55, an output unit 56, a storage location information generating unit 57, a storage location tagged mail generating unit 58, a check period configuration unit 59, an acquisition request acknowledgment unit 60, an electronic data loaded mail generating unit 61, and a memory 70.

The control unit 51 controls the operation of each element, such as the information input unit 51, and may be a computer including a central processing unit (CPU), a read only memory (ROM), a random access memory (RAM), an input and output (I/O) controller, a timer, and the like. The CPU implements an information input functionality and a communication functionality by operating a variety of hardware in a coordinated fashion in accordance with a control program pre-stored on the ROM or the like.

The operation unit 52 inputs information, such as characters, and selects a functionality. For example, the operation unit 52 includes a keyboard, a mouse, or a touch panel.

The information input unit 53 inputs specific information. For example, the information input unit 53 inputs image data and information of a document on which characters and drawings are depicted. The input information is stored as the electronic data on the memory 70. The information input unit 53 may be a scanner that reads images, or an interface that connects to an external memory medium, such as a universal serial bus (USB) memory. A variety of methods is available to input the image data or the information of documents. For example, a scanner is used to read a document on which information is printed, and the electronic data read from the document is stored on the memory 70 as input electronic data.

Alternatively, an electronic data file of an image or document to be input is stored on an external storage medium, such as a USB memory, the USB memory is connected to an input interface, such as a USB terminal, and a specific input operation is performed on the operation unit 52. The desired electronic data file stored on the USB memory is read and then stored onto the memory 70 as the input electronic data. The methods of inputting an image and document are not limited to those described above. Alternatively, an electronic data file may be input from another information processing apparatus TE via the LAN 10.

The communication unit 54 is designed to connect to the LAN 10 and exchanges data with the information processing apparatus 12. The communication unit 54 typically transmits an e-mail generated by the image forming apparatus MFP 11 to a specific information processing apparatus 12 via the mail server. As described above, via the LAN 10 and the WAN 20, the communication unit 54 exchanges data with the information processing apparatus 21 that is not directly connected to the LAN 10. The communication unit 54 also transmits an e-mail generated by the image forming apparatus MFP 11 to the information processing apparatus 21. Any of communication schemes based on existing standards may be used. Wired communication or wireless communication may be used.

As described below, the communication unit 54 transmits a storage location tagged e-mail generated by the storage location tagged mail generating unit 58 to the information processing apparatus TE serving as a specific transmission destination. The communication unit 54 also transmits an electronic data loaded e-mail generated by the electronic data loaded mail generating unit 61 to the information processing apparatus TE serving as the specific transmission destination. The communication unit 54 also receives acquisition request data transmitted from the information processing apparatus TE.

The display unit 55 displays, to a user, information, such as information used to execute a variety of functionalities, and results of the execution of the functionalities. The display unit 55 may be a liquid-crystal display (LCD), or an organic electroluminescent (EL) display. If a touch panel is used as the operation unit 52, the touch panel may be used in an overlaid state on the display.

The output unit 56 outputs information, and corresponds to a printer that prints the information on a paper medium.

The storage location information generating unit 57 generates the storage location information indicating the location where the electronic data is stored. The storage location information is information that identifies the location where the electronic data input by the information input unit 53 and stored on the memory 70 is present. The input electronic data is typically stored with a file name attached thereto, and information indicating the location of the file name is generated. As described below, a URL starting with http (for example, http://mfp/image/file/scandata01.pdf) is generated as information that identifies the location where the input electronic data is stored and the file name. URL allows the information processing apparatus serving as a specific transmission destination to access the location where the electronic data is stored.

The storage location information is included in a storage location tagged e-mail and the storage location tagged e-mail with the storage location information is transmitted to the specific destination. The storage location information is included in the acquisition request data transmitted from the information processing apparatus TE serving as the specific destination and then a file of the electronic data present at the location indicated by the storage location information is extracted.

Figures 4A, 4B:
FIG. 4A and FIG. 4B illustrate information used in the image forming apparatus of an embodiment of the disclosure.

The storage location tagged mail generating unit 58 generates the storage location tagged e-mail including the storage location information. The storage location tagged e-mail includes a URL that identifies the location where the input electronic data is stored and the file name, but does not include the electronic data itself. FIG. 4A illustrates an example the storage location tagged e-mail.

The check period configuration unit 59 configures a check configuration time that is a time period during which an acquisition request for the electronic data (acquisition request data) is checked. The acquisition request data is transmitted from the information processing apparatus TE as a transmission destination to which the storage location tagged e-mail has been transmitted is configured. In order to ensure security, the electronic data may be stored on the MFP or a time period during which the electronic data is acquired from an external information processing apparatus TE may be configured. A time period equal to a time period during which the acquisition of the electronic data is permitted (link effective time) may be set as the check configuration time. A time period different from the link effective time may be set as the check configuration time.

After transmitting the storage location tagged e-mail including the storage location information to the information processing apparatus serving as a specific transmission destination, the communication unit 54 initializes a check timer to the check configuration time, thereby starting the check timer that measures the check configuration time.

The acquisition request acknowledgment unit 60 acknowledges the reception of the acquisition request (acquisition request data) to acquire the electronic data transmitted from the information processing apparatus TE that is the transmission destination of the e-mail. Using the acquisition request data, the information processing apparatus TE having received the storage location tagged e-mail requests the stored input electronic data stored on the image forming apparatus MFP to be transmitted thereto. The acquisition request data includes the storage location information (URL) of the input electronic data to be acquired. Upon receiving the acquisition request data, the MFP reads the input electronic data stored at the location indicated by the storage location information (URL), and transmits the input electronic data to the information processing apparatus TE that has transmitted the acquisition request data. FIG. 4B illustrates an example of the acquisition request data.

If the check timer is started after the communication unit 54 transmits the storage location tagged e-mail to a specific information processing apparatus, the acquisition request acknowledgment unit 60 acknowledges the reception of the acquisition request data until the check configuration time has elapsed. If the acquisition request acknowledgment unit 60 does not acknowledge the acquisition request of the electronic data from the information processing apparatus as the transmission destination even after the check configuration time has elapsed, the electronic data loaded mail generating unit 61 described below generates the electronic data loaded e-mail including the electronic data, and the communication unit 54 transmits the electronic data loaded e-mail to the information processing apparatus as the transmission destination.

The electronic data loaded mail generating unit 61 generates the electronic data loaded e-mail including the electronic data. The electronic data loaded e-mail includes the file itself of the input electronic data. Since the file of the input electronic data is attached to the e-mail, the contents of the file are quickly checked by downloading and storing the file or by opening the file using a specific application program. FIG. 4A illustrates an example of the electronic data loaded e-mail.

The memory 70 stores information and a program that are used to execute each functionality of the image forming apparatus of the disclosure. The memory 70 may be a semiconductor memory, such as a ROM or a RAM, or a storage device, such as a hard disk drive (HDD) or a solid state drive (SSD), or other storage medium. The memory 70 includes transmission destination address information 71, input electronic data 72, a transmission information list 73, transmission mail information 74, acquisition request data 75, a check configuration time 76, a check timer 77, and a request acknowledgment flag 78, and other information.

The transmission destination address information 71 is the stored address of a transmission destination of an e-mail. The transmission destination address information 71 may be pre-stored on the memory 70 or may be input by a user prior to the transmission of the e-mail. FIG. 3A illustrates an example of the transmission destination address information 71. As illustrated in FIG. 3A, a single piece of the transmission destination address information 71 includes a transmission destination name, a mail address, and an identification ID stored in association with each other. The mail address and the identification ID correspond to the transmission destination information included in the e-mail.

The transmission destination name is information to discriminate transmission destinations, and may be a company name, or a personal name, for example. The mail address is data in the form of a typical e-mail address. The identification ID identifies the information processing apparatus TE as a transmission destination to which the e-mail is transmitted. To ensure security, a code encrypted in a predetermined encryption scheme (encrypted code) may be desirably used. Alternatively, the identification ID may be information including numerals and symbols, which do not have any particular meaning, or information into which the transmission destination name is encrypted. The storage location information is a URL itself, but may include a URL and an identification ID.

The input electronic data 72 is the electronic data that the information input unit 53 has input to the image forming apparatus MFP. As described above, the input electronic data 72 corresponds to image data read by a scanner, or data stored on an external USB memory. The input electronic data is tagged with a file name, and then stored on the memory 70. The storage location information generating unit 57 generates the storage location information (URL) identifying the storage location where the input electronic data is stored. FIG. 3B illustrates an example of the input electronic data 72. Referring to FIG. 3B, the input electronic data 72 includes a file name and storage location information (URL).

Figures 3C, 3D, 3E:

The transmission information list 73 includes information related to the e-mail that has been actually transmitted to a specific transmission destination. Each time the storage location tagged e-mail is generated, transmission information of that e-mail is generated and stored on the memory 70. When the electronic data loaded e-mail is generated, any transmission information thereof is not generated. FIG. 3C illustrates an example of the transmission information list 73. A single piece of the transmission information list 73 includes transmission destination information, storage location information, and a request acknowledgement flag. The transmission destination information includes the mail address and the identification ID. The request acknowledgement flag indicates the acquisition request of the input electronic data.

FIG. 3C illustrates two transmission information lists 73. The transmission information list 73 with the request acknowledgement flag "unfinished" means that the acquisition request data that is to be transmitted from the transmission destination having transmitted the storage location tagged e-mail has not been received yet. The transmission information list 73 with the request acknowledgement flag "finished" means that the acquisition request data transmitted from the transmission destination having transmitted the storage location tagged e-mail has been received, and that the electronic data identified by the acquisition request data has been transmitted to the transmission destination thereof.

The check configuration time 76 is a time period during which the acquisition request of the electronic data transmitted from the information processing apparatus TE is checked. As illustrated in FIG. 3D, for example, 30 minutes may be set as the check configuration time 76. Note that the check configuration time 76 is not limited to 30 minutes. The check configuration time 76 may be configured to be fixed in advance. Alternatively, the user may configure or modify the check configuration time 76 each time when the user inputs the electronic data or each time before the storage location tagged e-mail including the storage location information is transmitted. As described above, the check configuration time 76 may be configured to be equal to or different from the time period during which the acquisition of the electronic data is permitted (link effective time). For example, the check configuration time 76 may be configured to be a time period longer than the link effective time.

The check timer 77 measures the check configuration time 76, is started subsequent to the transmission of the storage location tagged e-mail, and continues to measure time until the acquisition request data is received. Immediately after the transmission of the storage location tagged e-mail, the check timer 77 is initialized to the check configuration time 76, and the check timer 77 starts counting down the check configuration time 76. When the check timer 77 reaches zero after the elapse of the time set in the check timer 77, the acquisition request data has not been received for the specific period time or longer from the transmission destination to which the storage location tagged e-mail has been transmitted. The electronic data loaded e-mail is thus transmitted to the transmission destination.

The request acknowledgment flag 78 indicates the acquisition request of the input electronic data. More specifically, the request acknowledgment flag 78 indicates whether the acquisition request of the input electronic data transmitted from the information processing apparatus TE as the transmission destination of the e-mail has been received and whether the electronic data identified by the acquisition request data has been transmitted to the information processing apparatus TE as the transmission destination. The request acknowledgement flag "unfinished" in FIG. 3E indicates that the acquisition request data has not been received. The request acknowledgement flag "finished" indicates that the acquisition request data has been received and that the electronic data identified by the acquisition request data has been transmitted to the information processing apparatus TE. The request acknowledgment flag 78 is configured on a per transmission destination basis of the transmission information list 73 of FIG. 3C.

The transmission mail information 74 is an e-mail that is transmitted to the information processing apparatus TE. The e-mail that is to be transmitted to the information processing apparatus TE includes a storage location tagged e-mail generated by the storage location tagged mail generating unit 58 and an electronic data loaded e-mail generated by the electronic data loaded mail generating unit 61. FIG. 4A illustrates an example of the transmission mail information 74. A single piece of the transmission mail information 74 includes a sender address, a transmission destination address, a transmission destination address, a transmission destination identification ID, a mail title, and a mail body.

The e-mail transmitted from the image forming apparatus MFP includes as the sender address an e-mail address assigned to the image forming apparatus MFP in advance. The sender address and the transmission destination identification ID are read from the transmission destination address information 71. The mail title and the mail body are input in a way similar to the way a typical the e-mail is input. In the e-mail transmitted from the image forming apparatus MFP, the phrase reading "Transmission of e-mail" is automatically set as the mail title. A fixed form sentence is automatically included in the mail body.

The column of the mail title may be left blank, and a fixed form sentence may not be necessarily included in the mail body. If no fixed form sentence is included, time and date on which the electronic data is stored on the image forming apparatus MFP may be included in the mail body. In the case of the storage location tagged e-mail, the mail body may include only URL indicating the storage location without any fixed form sentence included therein. In the case of the electronic data loaded e-mail, the mail body itself may be left blank.

In the storage location tagged e-mail of FIG. 4A, for example, fixed form sentences reading "Information regarding storage location of electronic data is sent. Receive by clicking on URL below" is written in the mail body and URL as the storage location information of the electronic data may be written in the body. In the electronic data loaded e-mail of FIG. 4A, fixed form sentences reading "Electronic data file is attached. Select and store electronic data file" are written in the mail body, and further, an attached file name of the electronic data is written in the mail body, and the electronic data file itself is attached.

The acquisition request data 75 is transmitted from the information processing apparatus TE that is the transmission destination of the e-mail transmitted from the image forming apparatus MFP. As illustrated in FIG. 4B, the acquisition request data 75 includes a sender address, a transmission destination address, a sender identification ID, a data name, and a storage location information of electronic data (URL).

Figure 5:
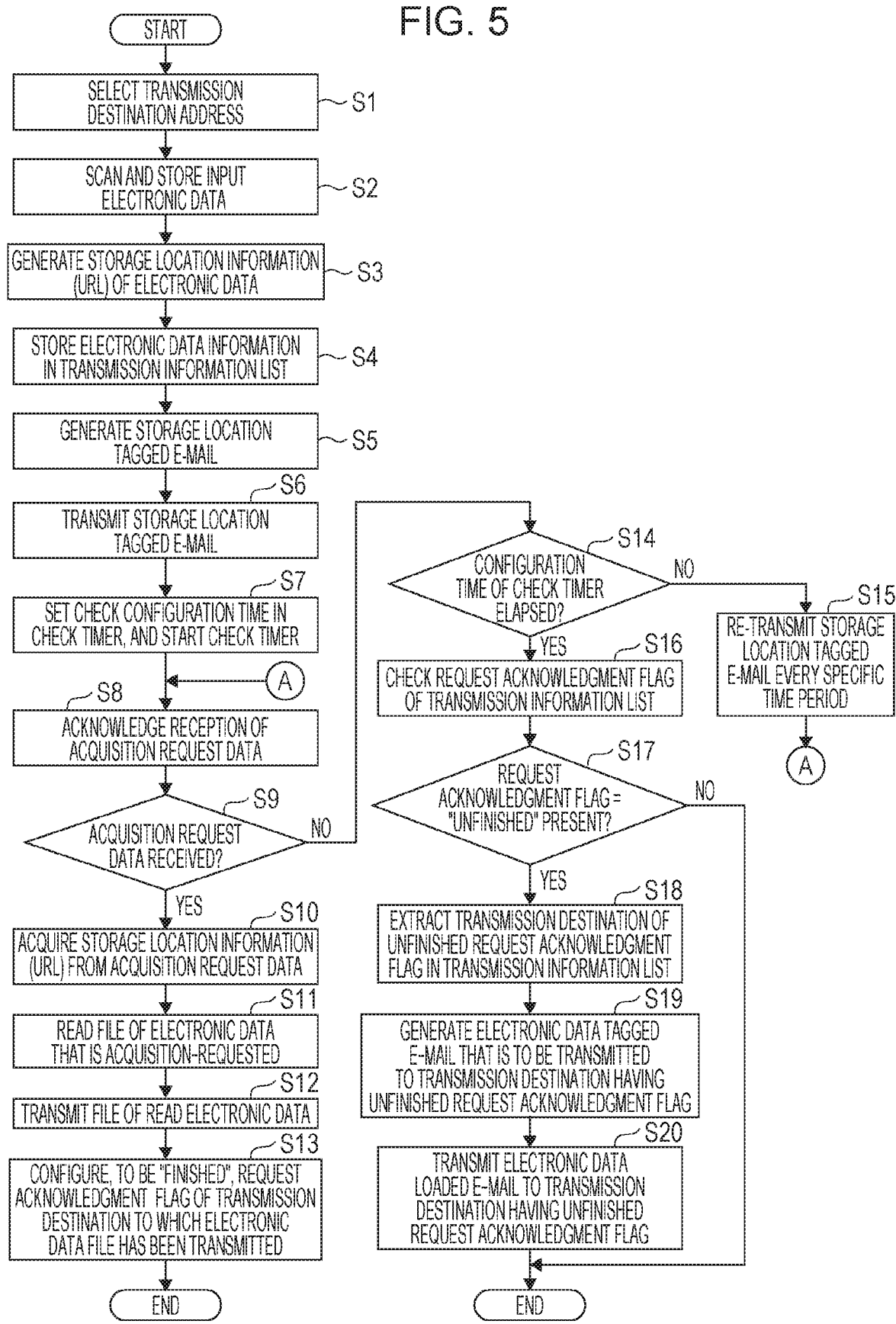
FIG. 5 is a flowchart illustrating of an e-mail transmission process and other processes of the image forming apparatus of an embodiment of the disclosure.

The transmission destination address of the transmission mail information 74 is configured in the sender address, the sender address of the transmission mail information 74 (the e-mail address of the image forming apparatus MFP) is configured in the transmission destination address, and the transmission destination identification ID of the transmission mail information 74 is configured in the sender identification ID. A phrase "Acquisition request of electronic data" is automatically configured in the data name, and the storage location information (URL) written in the mail body of the received storage location tagged e-mail is configured in the storage location information. Flowchart of e-mail transmission process of image forming apparatus FIG. 5 is a flowchart illustrating of an e-mail transmission process and other processes of the image forming apparatus of the embodiment of the disclosure. The flowchart is based on the premise that the check configuration time 76 has been configured in advance. However, note that the user may input the check configuration time 76 when the transmission destination or image data is input.

In step S1, using the operation unit 52, the user selects the transmission destination address of a partner user to which the image data is to be transmitted. A list of transmission destination names in the transmission destination address information 71 stored on the memory 70 is displayed on the display unit 55 so that the user may select and enter a transmission destination name of a partner user to which the user is going to transmit the image data. Alternatively, if the transmission destination name of the partner user to which the user is going to transmit the image data is not stored yet, the user may directly input the e-mail address of the partner user. The mail address and identification ID corresponding to the selected transmission destination name are read from the transmission destination address information 71.

In step S2, using the information input unit 53, the user enters the image data to be transmitted. For example, the user may read the image data on a paper sheet using a scanner, and stores data, into which the read image data is digitized, as the input electronic data 72 on the memory 70.

In step S3, the storage location information generating unit 57 generates the storage location information (URL) of the input electronic data 72. The file name of the input electronic data 72 and the generated storage location information (URL) are stored in association with each other in the input electronic data 72. In step S4, information related to the input electronic data is stored in the transmission information list 73. For example, transmission destination information including the read mail address and identification ID, the generated storage location information (URL), and the request acknowledgement flag "unfinished" are stored in association with each other.

In step S5, the storage location tagged mail generating unit 58 generates a storage location tagged e-mail. For example, the storage location tagged e-mail of FIG. 4A is generated. The storage location information (URL) is written in the mail body. In step S6, the communication unit 54 transmits the storage location tagged e-mail. The storage location tagged e-mail is transmitted to a mail server, and reaches the information processing apparatus TE as the transmission destination via LAN and/or WAN. In step S7, the check configuration time 76 is configured in the check timer 77, and the check timer 77 starts to measure time.

In step S8, the acquisition request acknowledgment unit 60 acknowledges the reception of the acquisition request data 75. If the acquisition request acknowledgment unit 60 determines in step S9 that the acquisition request data 75 has been received, processing proceeds to step S10; otherwise, processing proceeds to step S14.

In step S10, the storage location information (URL) included in the received acquisition request data 75 is acquired. In step S11, the file of the electronic data with the acquisition thereof requested by the acquisition request data is read from the memory 70 in accordance with the storage location information (URL). In step S12, the file of the read electronic data is transmitted to the information processing apparatus TE that has transmitted the acquisition request data. In step S13, out of the transmission information stored in the transmission information list 73, the request acknowledgement flag of the transmission destination to which the file of the electronic data has been transmitted is configured to be "finished", and processing ends.

In step S14, it is checked whether the check configuration time 76 configured on the check timer 77 has elapsed. If the check configuration time 76 has elapsed, processing proceeds to step S16; otherwise, processing proceeds to step S15. In step S15, the storage location tagged e-mail is re-transmitted every specific time period, and then processing returns to step S8. The specific time period may be configured to be any time shorter than the check configuration time 76 (for example, 5 minutes). Processing may return to step S8 with step S15 skipped.

In step S16, all request acknowledgment flags 78 stored on the transmission information list 73 are checked. In step S17, it is checked whether any request acknowledgment flag 78 is configured to be "unfinished". If any request acknowledgment flag 78 is configured to be "unfinished", processing proceeds to step S18. If none of the request acknowledgment flags 78 are configured to be "unfinished", processing ends.

In step S18, a transmission destination having a request acknowledgment flag 78 being "unfinished" in the transmission information list 73 is extracted. In step S19, the electronic data loaded mail generating unit 61 generates an electronic data loaded e-mail that is to be transmitted to the transmission destination having the request acknowledgment flag 78 being "unfinished". In this case, the electronic data loaded e-mail of FIG. 4A is generated. The mail address of the transmission destination information with the request acknowledgment flag 78 being "unfinished" is configured in the transmission destination address, and the identification ID is configured in the transmission destination identification ID. Specific fixed form sentences are configured in the mail title and the mail body. The electronic data to be transmitted is read by referencing the storage location information (URL) with the request acknowledgment flag 78 being "unfinished" in the transmission information list, and is then attached to the e-mail.

In step S20, the communication unit 54 transmits the generated electronic data loaded e-mail to the transmission destination with the request acknowledgment flag 78 being "unfinished". Processing then ends.

In this way, when the image data to be transmitted to the information processing apparatus TE is input, the storage location tagged e-mail is transmitted instead of directly transmitting the e-mail including the electronic data. The workload on the mail server is thus reduced. If the check configuration time has elapsed with no acquisition request data received since the transmission of the storage location tagged e-mail, the electronic data loaded e-mail is automatically transmitted without the user's operation on the image forming apparatus MFP. The workload on the user is reduced. Even if the information processing apparatus TE has no direct access to the image forming apparatus MFP, the user of the information processing apparatus TE may acquire the electronic data after the elapse of the check configuration time.

Figure 6:
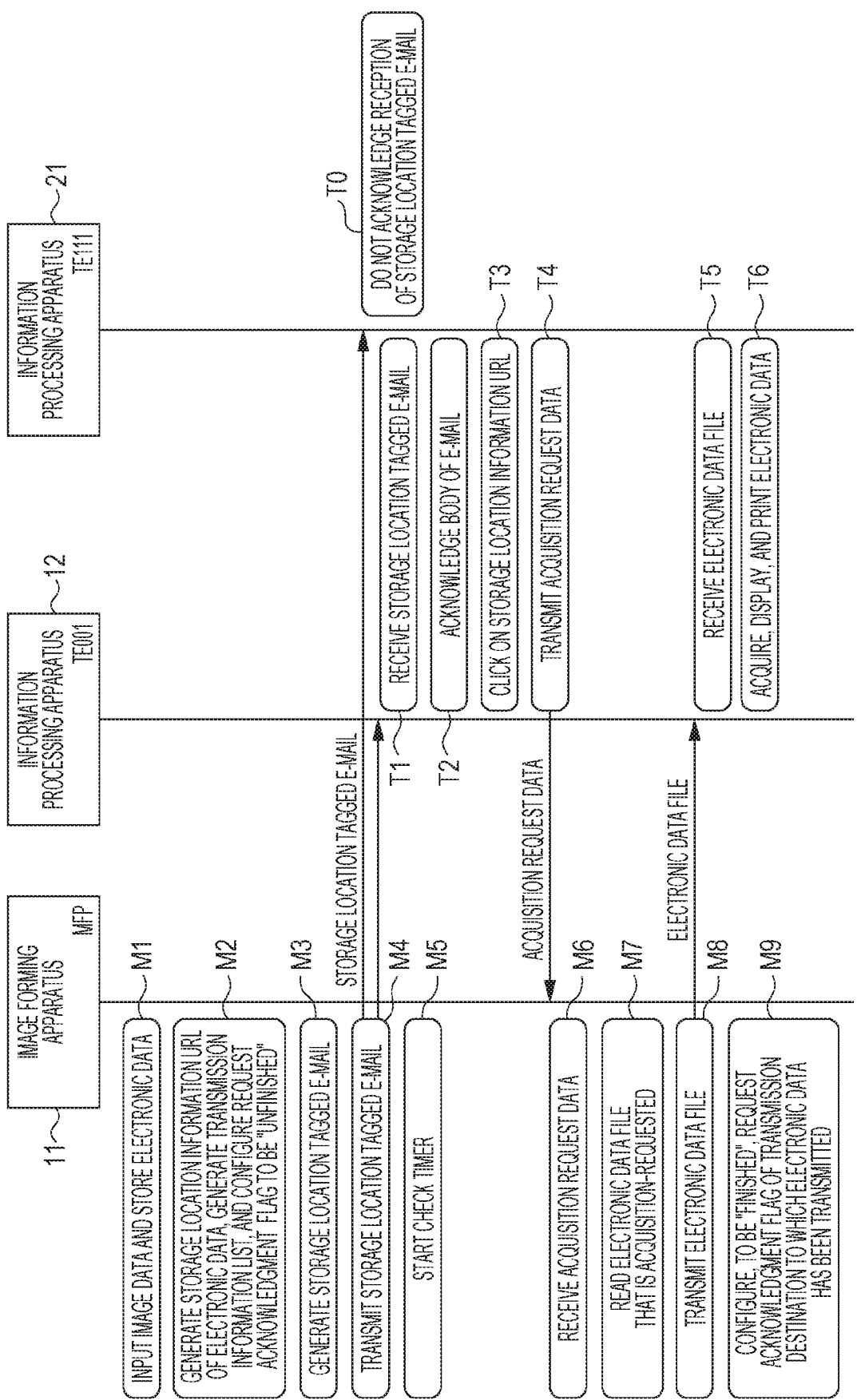
FIG. 6 is a communication sequence chart of communication performed between the image forming apparatus and the information processing apparatus in accordance with an embodiment of the disclosure.

Communication Sequence Between Image Forming Apparatus and Information Processing Apparatus First Embodiment FIG. 6 is a communication sequence chart of communication performed between the image forming apparatus MFP and the information processing apparatus TE in accordance with a first embodiment of the disclosure. In the communication sequence, the information processing apparatus TE transmits the acquisition request of the electronic data to the image forming apparatus MFP after the image forming apparatus MFP transmits the storage location tagged e-mail to the information processing apparatus TE.

The process of the communication sequence chart is based on the premise that the image data input to the image forming apparatus MFP is transmitted to two information processing apparatuses (TE001 and TE111). The process is also based on the premise that the transmission destination address of the e-mail to which the input image data is to be transmitted is configured in advance in response to the user's specific input operation.

In step M1 of the image forming apparatus MFP of FIG. 6, the user performs a specific input operation using the operation unit 52, inputs the image data using the information input unit 53, and stores the image data as the input electronic data 72 on the memory 70. For example, the user reads the image data on a paper sheet using a scanner. A specific file name is attached to the read image data and the image data is stored as the input electronic data 72 on the memory 70.

In step M2, the storage location information generating unit 57 generates the storage location information (URL) of the input electronic data 72. The transmission information list 73 is generated, and information concerning the electronic data to be transmitted is stored in the transmission information list 73. The transmission destination address information 71 and the storage location information of the input electronic data 72 are stored in association with each other, and the request acknowledgment flag 78 is configured to be "unfinished".

In step M3, the storage location tagged mail generating unit 58 generates a storage location tagged e-mail. For example, addresses of users of the two information processing apparatuses (TE001 and TE111) are configured in the transmission destination address of the storage location tagged e-mail. In step M4, the communication unit 54 transmits the storage location tagged e-mail.

In step M5, the check timer 77 is initialized to the check configuration time 76, and starts up. The acquisition request acknowledgment unit 60 periodically checks whether the acquisition request data transmitted from the information processing apparatus TE is received.

The acquisition request acknowledgment unit 60 determines in step T0 that the user of the information processing apparatus TE111 has not received the storage location tagged e-mail and determines in step T1 that the user of the information processing apparatus TE001 has received the storage location tagged e-mail.

In step T2, the user of the information processing apparatus TE001 acknowledges the body of the received storage location tagged e-mail and learns that the electronic data to be acquired is stored on the image forming apparatus MFP. In step T3, the user of the information processing apparatus TE001 clicks on the storage location information URL written in the body of the storage location tagged e-mail. In step 14, the information processing apparatus TE001 generates the acquisition request data, and transmits the acquisition request data to the image forming apparatus MFP. The acquisition request data includes the storage location information URL as described above.

In step M6, the acquisition request data is received from the information processing apparatus TE001. In step M7, the received acquisition request data is analyzed, and the file of the electronic data whose acquisition is requested is read using the storage location information URL. In step M8, the file of the read electronic data is transmitted to the information processing apparatus TE001. In step M9, the request acknowledgement flag in the transmission information list 73 of the transmission destination to which the electronic data has been transmitted is configured to be "finished".

In step T5, the information processing apparatus TE001 receives the file of the electronic data. In step T6, the information processing apparatus TE001 acquires the file of the electronic data, and the user of the information processing apparatus TE001 checks the contents of the electronic data by displaying or printing the file.

In this way, the input electronic data is transmitted to the information processing apparatus TE001 that has transmitted the acquisition request data. If a first e-mail (a storage location tagged e-mail) is transmitted subsequent to the inputting of the electronic data, the electronic data is not attached to the first e-mail. The workload on the mail server is thus lighter when the e-mail is transmitted to multiple destinations than when the e-mail with the electronic data attached thereto is concurrently transmitted to the multiple destinations. The image forming apparatus MFP transmits the electronic data after the acquisition request data is received from the information processing apparatus TE. This reduces the possibility that the transmission of the electronic data congests at the same time point.

Second Embodiment

FIG. 7 is a communication sequence chart of communication performed between the image forming apparatus MFP and the information processing apparatus TE in accordance with a second embodiment of the disclosure. The process of the communication sequence chart is performed if the information processing apparatus TE fails to transmit the acquisition request of the electronic data to the image forming apparatus MFP even after the specific check configuration time has elapsed since the transmission of the storage location tagged e-mail to the information processing apparatus TE.

The image forming apparatus MFP of FIG. 7 performs steps M1 through M5, which are identical to steps M1 through M5 in the process of FIG. 6. In this way, the storage location tagged e-mail is transmitted to the two information processing apparatuses (TE001 and TE111). It is now assumed in step T0 that the users of the information processing apparatus TE001 and the information processing apparatus TE111 neither acknowledge the storage location tagged e-mail nor respond to the storage location information. The cause why the users of the information processing apparatuses TE have not responded may be a connection failure of a network, or because the acquisition request data from the information processing apparatus TE fails to reach the image forming apparatus MFP because a security functionality configured in the network.

In step M11, the acquisition request acknowledgment unit 60 periodically checks the reception of the acquisition request data transmitted from the information processing apparatus TE. If the acquisition request data has not been received for a specific time period, which is different from the check configuration time of the check timer, the storage location tagged e-mail is re-transmitted at specific time intervals until the check configuration time has elapsed. It is also now assumed that none of the users of the information processing apparatus TE001 and the information processing apparatus TE111 have responded to the re-transmitted storage location tagged e-mail.

In step M12, the check timer reaches zero, and it is verified that the time set on the check timer has elapsed. In step M13, a search is made on the transmission information list 73, and a transmission destination with the currently stored request acknowledgement flag being "unfinished" is extracted. In step M14, the electronic data that is stored at the location indicated by the storage location information corresponding to the transmission destination having the request acknowledgement flag being "unfinished" is read.

In step M15, the electronic data loaded mail generating unit 61 generates an electronic data loaded e-mail, and transmits the electronic data loaded e-mail to the information processing apparatus TE001 and the information processing apparatus TE111. Without the user performing any input operation, the image forming apparatus MFP automatically transmits the electronic data loaded e-mail when the check timer reaches zero. In step M16, the request acknowledgement flag in the transmission information list 73 of the transmission destination to which the electronic data loaded e-mail has been transmitted is configured to be "finished".

In step T11, the users of the information processing apparatus TE001 and the information processing apparatus TE111 may receive the electronic data loaded e-mail. Since the electronic data is attached to the received electronic data loaded e-mail, the user acquires the electronic data by perform a specific operation in step T12. The user may verify the contents of the electronic data by displaying or printing the electronic data.

As described above, the input electronic data loaded e-mail is automatically transmitted to the information processing apparatus TE that has not transmitted the acquisition request data. The user is free from performing any particular input operation on the image forming apparatus MFP. The re-transmission operation of the electronic data on the image forming apparatus MFP is thus omitted, leading to a reduction in the operational workload on the user.

In the same way as in the first embodiment, the electronic data is not attached to the e-mail thereof when a first e-mail is transmitted subsequent to the inputting of the image data. The workload on the mail server is reduced more when the e-mail is transmitted to multiple destinations than when the e-mails with the electronic data attached thereto are transmitted to the multiple destinations. The image forming apparatus MFP transmits the electronic data loaded e-mail only to the information processing apparatus TE that has not transmitted the acquisition request data. This may possibly reduce the workload on the mail server congesting at a given moment more when the electronic data loaded e-mail is transmitted only to the information processing apparatus TE that has not transmitted the acquisition request data than when the electronic data loaded e-mail is transmitted to all the information processing apparatuses TE to which the electronic data loaded e-mail is to be transmitted.

Third Embodiment

In accordance with the second embodiment, the storage location tagged e-mail is re-transmitted if the acquisition request data is not received even after the elapse of the specific time period. This increases the opportunity that the information processing apparatus TE transmits the acquisition request data. However, for the network security, the reception of the acquisition request data may continue to be difficult, and the re-transmission of the storage location tagged e-mail may not be useful. The re-transmission of the storage location tagged e-mail may not necessarily be performed. Whether to re-transmit the storage location tagged e-mail may be pre-set. The time interval at which the storage location tagged e-mail is re-transmitted may be configured to be any time period (5 minutes, for example) shorter than the check configuration time 76. If the storage location tagged e-mail is to be transmitted to multiple transmission destinations, the time interval may be configured to be different from transmission destination to transmission destination.

Fourth Embodiment

In accordance with the embodiments, the storage location tagged e-mail is transmitted before the electronic data input on the image forming apparatus MFP is transmitted to the information processing apparatus TE. However, for the network security, the acquisition request data is not received from the information processing apparatus TE having no direct access to the image forming apparatus MFP. When the storage location tagged e-mail is transmitted, the electronic data is typically transmitted to the information processing apparatus TE in the procedure of the second embodiment if the user of the image forming apparatus MFP does not perform any particular operation on the image forming apparatus MFP.

More specifically, the electronic data loaded e-mail is transmitted to the information processing apparatus TE after the check configuration time has elapsed since the transmission of the storage location tagged e-mail. In such a case, the user of the information processing apparatus TE having no direct access to the image forming apparatus MFP is unable to quickly acquire the electronic data. The user of the information processing apparatus TE is not able to access to the image forming apparatus MFP. In order to acquire the electronic data, the user of the information processing apparatus TE may possibly request the user of the image forming apparatus MFP to continuously transmit the electronic data loaded e-mail using a different communication system, such as telephone. The user of the information processing apparatus TE takes time to acquire the electronic data.

The communication unit 54 may transmit the electronic data stored on the memory 70 to the information processing apparatus TE to which the electronic data loaded e-mail has once been transmitted. In such a case, the communication unit 54 transmits to the information processing apparatus TE the electronic data loaded e-mail including the electronic data to be transmitted without transmitting the storage location tagged e-mail including the storage location information of the electronic data to be transmitted. More specifically, in order to transmit a new e-mail for the next time and thereafter to the information processing apparatus TE that the electronic data loaded e-mail has been transmitted in the procedure of the second embodiment, the communication unit 54 transmits the electronic data loaded e-mail instead of transmitting the storage location tagged e-mail.

To perform the above process, an attachment flag indicating the necessity of the file attachment is stored in the transmission destination address information 71 on a per transmission destination basis. If the electronic data is transmitted after the acquisition request data is received in the procedure of the first embodiment, the attachment flag of the transmission destination is configured to be "undesired" in the attachment flag of the transmission destination. On the other hand, if the electronic data loaded e-mail is transmitted in the procedure of the second embodiment, the attachment flag of the transmission destination is configured to be "desired". When the electronic data input to the image forming apparatus MFP is transmitted, the attachment flag is checked first. If the attachment flag is "undesired", the storage location tagged e-mail is transmitted, and if the attachment flag is "desired", the electronic data loaded e-mail is transmitted.

The user of the information processing apparatus TE having received the electronic data loaded e-mail, namely, the user of the information processing apparatus TE having no direct access to the image forming apparatus MFP, may acquire the electronic data quickly for the next time. The user of the image forming apparatus MFP is free from checking each time whether the transmission destination to which the electronic data has been once transmitted is the user of the information processing apparatus TE having no direct access. The workload on each user is thus reduced.

Fifth Embodiment

In the embodiments described above, the check configuration time 76 is configured to be a fixed value. For example, in step S2 of FIG. 5, the user may configure the check configuration time 76 each time the image data is input. The check configuration time 76 may be configured to be a value different on a per storage location tagged e-mail basis or on a per transmission destination address basis of the storage location tagged e-mail. In such a case, the check configuration time 76 may be stored on a per piece of information basis of the information stored in the transmission information list 73. Multiple check timers having different initial check configuration times set thereon are started.

To ensure security, a time period (link effective time) during which the electronic data is acquired from an external information processing apparatus TE may be configured. In a similar way, the link effective time may be input in step S2 of FIG. 5. The check configuration time 76 may be configured to be longer than the link effective time. If the check configuration time 76 and the link effective time are configured to be the same value, that value may simply input commonly for one of them.

Sixth Embodiment

In the embodiments described above, the storage location tagged e-mail includes the transmission destination identification ID and the storage location information (URL) in a separate form. Alternatively, a combination of information including the transmission destination identification ID and the storage location information URL may be written in the mail body. For example, information such as http://mfp/image/file/scandata01.pdf+user-1234 may be written. To increase security, data resulting from encrypting the information of the combination of the transmission destination identification ID and the storage location information URL may be written in the mail body.

The present disclosure contains subject matter related to that disclosed in Japanese Priority Patent Application JP 2017-059741 filed in the Japan Patent Office on Mar. 24, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image transmission apparatus comprising:
an information input unit that inputs predetermined information;
a memory that stores the input predetermined information as electronic data;
a communication unit that transmits an electronic mail to a predetermined information processing apparatus;
a storage location information generating unit that generates storage location information indicating a location where the electronic data is stored;
a storage location tagged mail generating unit that generates a storage location tagged electronic mail including the storage location information;
an acquisition request acknowledgment unit that acknowledges an acquisition request to acquire electronic data from the information processing apparatus; and
an electronic data loaded mail generating unit that generates an electronic data loaded mail including the electronic data,
wherein if the acquisition request acknowledgment unit does not acknowledge the acquisition request of the electronic data from an information processing apparatus serving as a predetermined transmission destination after a predetermined check configuration time has elapsed since transmission of the storage location tagged electronic mail including the storage location information from the communication unit to the information processing apparatus as the predetermined transmission destination, the electronic data loaded mail generating unit generates the electronic data loaded mail including the electronic data, and the communication unit transmits the electronic data loaded mail including the electronic data to the information processing apparatus as the predetermined transmission destination.

2. The image transmission apparatus according to claim 1, further comprising a check period configuration unit that configures a check configuration time during which the acquisition request of the electronic data is checked,
wherein the communication unit starts a check timer to measure the check configuration time, after transmitting the storage location tagged electronic mail including the storage location information to the information processing apparatus as the predetermined transmission destination.

3. The image transmission apparatus according to claim 1, wherein the communication unit re-transmits the storage location tagged electronic mail at fixed time intervals until the check configuration time has elapsed since the transmission of the storage location tagged electronic mail from the communication unit to the information processing apparatus as the predetermined transmission destination.

4. The image transmission apparatus according to claim 1, wherein the storage location information comprises a uniform resource locator (URL) through which the information processing apparatus as the predetermined transmission destination accesses the location where the electronic data is stored.

5. The image transmission apparatus according to claim 4, wherein the storage location information comprises the URL and information identifying the information processing apparatus as the predetermined transmission destination to which an electronic mail is transmitted.

6. The image transmission apparatus according to claim 1, wherein in order to transmit the electronic data stored on the memory to the information processing apparatus to which the electronic data loaded mail has been transmitted, the communication unit transmits to the information processing apparatus an electronic data loaded electronic mail including electronic data to be transmitted, without transmitting a storage location tagged electronic mail including storage location information of the electronic data to be transmitted.

7. The image transmission apparatus according to claim 1, wherein the information input unit comprises a scanner that reads image data.

8. An electronic data transmission method comprising:
inputting predetermined information and storing the predetermined information as electronic data;
generating storage location information indicating a location where the electronic data is stored; and
if an acquisition request of the electronic data is not received from an information processing apparatus serving as a predetermined transmission destination after a predetermined check configuration time has elapsed since transmission of a storage location tagged electronic mail including the storage location information to the information processing apparatus as the predetermined transmission destination, automatically transmitting an electronic data loaded electronic mail including the electronic data to the information processing apparatus as the predetermined transmission destination.

* * * * *